April 3, 1956  G. W. KING  2,740,932
TWO SPEED MOTOR CONTROL
Filed April 27, 1954
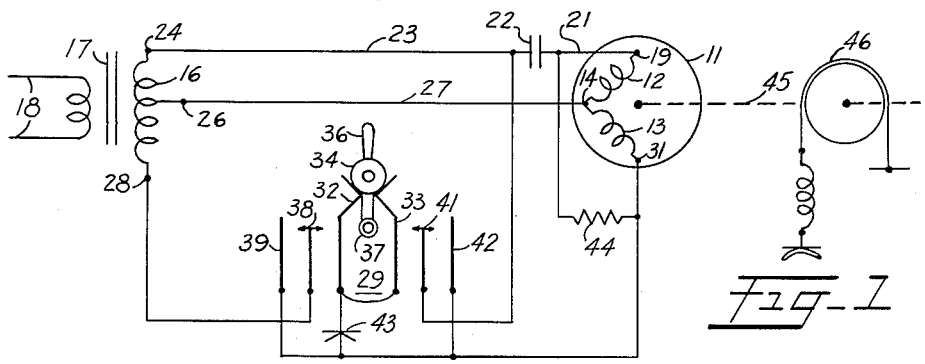
Fig. 1
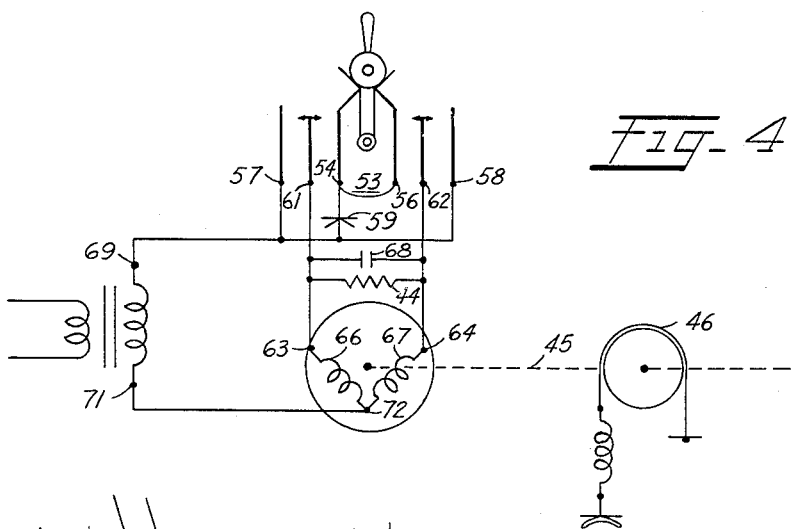
Fig. 4
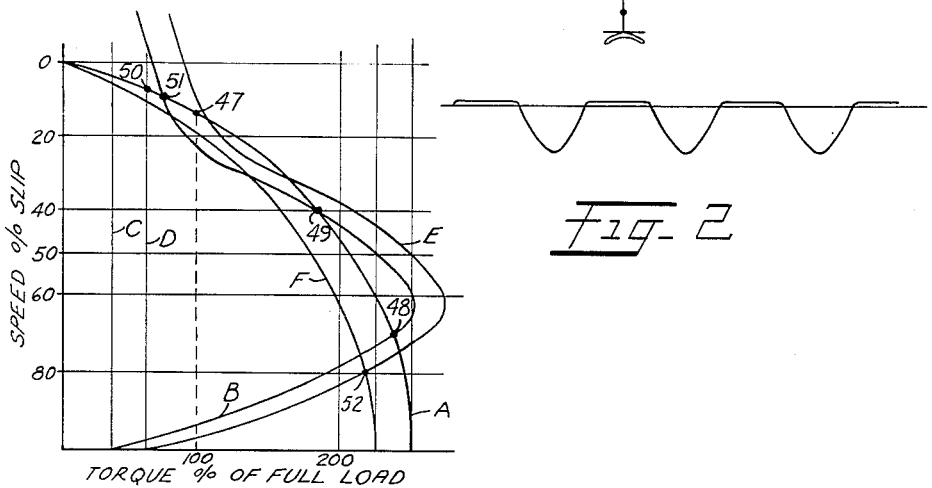
Fig. 2
Fig. 3
INVENTOR.
GEORGE W. KING
BY
ATTORNEY

United States Patent Office 2,740,932
Patented Apr. 3, 1956

2,740,932

TWO SPEED MOTOR CONTROL

George W. King, Pleasantville, N. Y., assignor to General Precision Laboratory Incorporated, a corporation of New York Application April 27, 1954, Serial No. 425,821

8 Claims. (Cl. 318—216)

This invention relates to electrical motor controls and more specifically to the step control of induction motors.

It has been found that when the current applied to one phase of a polyphase induction motor contains a direct current component, a braking effect is produced. It has also been found that under certain conditions of operation this braking effect produces a specific low motor speed combined with high torque. These facts are employed in the present invention to provide a simple step control by which a polyphase motor is made to operate either at a selected low speed or at full speed in either the forward or reverse direction.

Two-speed reversible motors have important applications in the control of artillery pieces, searchlights, and fire control directors. In the use of these weapons against fast-moving targets it is essential to slew the weapon rapidly toward the target yet to be able to slow the rotation of the mount to place the sights directly on the target. The invention also has application in the "panning" of motion picture and television cameras, in which the requirements are similar.

In the application of this invention to small instrument motors the power is conveniently secured by the use of a single-phase source and a phase-splitting condenser or inductance. The direct current is conveniently secured by rectification of the alternating current.

One purpose of this invention is to provide apparatus for operating a polyphase motor at a slow and definite speed by introducing direct current into the motor in addition to the alternating current.

Another purpose of this invention is to provide a polyphase induction motor in combination with a rectifier and switch to secure reversible two-speed operation.

Further understanding of this invention may be secured from the detailed description and associated drawings, in which:

Figure 1 depicts the circuit of an adjustable speed two-phase motor operated from a center-tapped transformer winding.

Figures 2 and 3 are graphs illustrating circuit operation.

Figure 4 depicts the circuit of an adjustable speed two-phase motor operated from a two-terminal power source.

This invention is applicable to two-phase and three-phase motors, and in general to the control of polyphase motors of all sizes. The required direct current may be derived from any source. The polyphase current may also be derived in any way, including phase splitting methods. However, the invention is particularly useful when applied to fractional horsepower motors, and low power circuit arrangements including the use of phase splitters and dry disc rectifiers are especially convenient.

A preferred embodiment employing a two-phase instrument inductor motor operated on two-phase power derived by phase splitting and combined with the use of a rectifier is illustrated by the circuit of Fig. 1. In this figure motor 11 is provided with two windings, 12 and 13, connected at a common terminal 14. The motor is operated from the center-tapped secondary winding 16 of the transformer 17 energized from single-phase mains 18. One motor winding 12 having terminals 19 and 14 is connected to one-half of the transformer secondary winding 16 through conductor 21, phase-advancing condenser 22 and conductor 23, the return path extending from transformer mid tap 26 through conductor 27 to the common motor terminal 14. The remaining transformer secondary winding end terminal 28 is connected through a switch 29 to the remaining motor terminal 31.

The switch 29 is of the manual five-position type, and is employed merely to facilitate description of the fundamental design and operation of this circuit, but it is understood that, in place of the manual switch, automatic switches and circuits may be employed.

The switch 29 is provided with two spring armatures 32 and 33 which press against disc 34 of operating handle 36, holding it in a central position. When handle 36 is rotated toward the left about its bearing 37, spring armature 32 is brought into engagement with spring contact 38. Further movement connects both spring armature 32 and spring contact 38 with contact 39. Movement toward the right restores the open-circuit conditions of the contacts as drawn, and then brings spring armature 33 first into engagement with contact spring 41, and finally into engagement with contact 42. Spring armatures 32 and 33 are connected together, and spring contacts 39 and 42 are likewise interconnected. Spring contact 38 is connected to terminal 28 and contact 41 is connected to terminal 24 while contacts 39 and 42 are connected to motor terminal 31. A rectifier 43 of the dry disc type employing selenium, although the copper oxide type or other types may be substituted, is connected between spring armature 32 and contact 39.

The motor 11 is provided with a resistor 44 connected between terminals 19 and 31. Mechanical output is taken from the motor shaft 45, which is provided with a friction brake 46. One function of both the resistor 44 and the friction brake 46 is to prevent the motor from creeping slowly when the switch 29 is in its center position. In this position the switch applies no power to motor winding 13, but full power remains connected through the phase-advance condenser 22 to winding 12. In the absence of the resistor and brake it has been found that, under some conditions, the motor is liable to start slowly when only a single winding is energized, and may even run at about full speed under no load.

When the lever 36 of switch 29 is moved to the left, transformer terminal 28 is connected through rectifier 43 to motor terminal 31. The rectifier converts the alternating current to pulsating direct current having a waveform similar to that indicated in Fig. 2. The alternating-current component of this waveform, has a phase which lags that supplied through condenser 19 to winding 12, by approximately 90° and the motor is thereby caused to rotate. The direct-current component of the rectifier output, interacting with the alternating current in winding 12, exerts a magnetic drag on the motor. The resultant of these two forces operates to rotate the motor at a speed which is primarily dependent upon circuit parameters and is only secondarily dependent upon the load attached to the motor shaft.

This action may be understood by an examination of the motor speed-torque curves of Fig. 3. Curve A, is the normal speed-torque characteristic of a small two-phase motor operated by phase-splitting from a single-phase source. At its full torque load operating point 47 the motor has about 15% slip. Curve B represents the resistance or braking torque offered by the motor when direct current is applied. The straight line C represents the resistance to rotation offered by the motor bearings and connected load. Curve B is experimentally plotted by connecting one motor winding to an alternating-current source and the other winding to a direct-current source. The motor will not then rotate by itself, so is rotated through a dynamometer by another motor at an adjustable speed which is gradually increased. Readings are taken of the torque of the resistance offered by the motor under test. This torque gradually increases in accordance with curve B from zero speed nearly in a straight line to a maximum torque at about 40% speed, i. e. 60% slip. The torque then decreases, tracing a third order curve which crosses the operating curve A at three points 48, 49, and 51.

If alternating current is now applied to both windings of such a motor so that it rotates in accordance with characteristic A, and if at the same time it is provided with direct-current superimposed on the alternating current of either winding, or equivalent even harmonics are introduced, thus producing the retarded torque of curve B, then, if the initial motor condition is one of rest, motor speed will increase to that indicated by the point 48, at which speed it will remain because the rotative force represented by curve A is then equal to the net resisting forces represented by curve B. If, however, the motor is started from full speed, and the direct current is then applied, the speed will decrease along curve A to that indicated by the point 51, at which speed equilibrium will be attained and the indicated speed will be maintained. If the initial motor speed is somewhere between that indicated by points 51 and 48 before application of the direct current, the motor will, if above point 49, increase in speed to that of point 51, and if below point 49, will reduce in speed to that of point 48, point 49 representing a condition of unstable equilibrium.

In order to eliminate this undersirable ambiguity in operation represented by points 51 and 48 and to cause the motor to have only a single stable low speed operating point, the brake 46, Fig. 1, is employed to increase the friction load. The total motor load including brake friction and useful load is then represented by the straight line D, Fig. 3. The effect is to increase the abscissae of curve B, which is thereby moved toward the right to the position of curve E. This action nearly but not quite eliminates the triple intersection with curve A. In order completely to eliminate the triple intersection, resistor 44, Fig. 1, is added. This resistor is made to have a value approximately ten times the value of the resistance of motor windings 12 and 13, while the ratio of the resistor resistance to the winding impedance is one-half. The resistor therefore absorbs a considerable part of the alternating current applied to the motor but only a small amount of the direct current, so that instead of operating on characteristic A, Fig. 3, the motor operates on a characteristic which is further to the left, in the position of curve F. This curve intersects curve E only once, at point 52, therefore the motor will operate unambiguously at this speed and torque, regardless of whether it is started from full speed, from zero speed, or from any other speed.

Point 50, Fig. 3, represents the condition of full speed operation in the absence of direct current under the load, both useful and friction, represented by line D. Under other load conditions this point might be moved as far as 47, where 100% of rated full torque would be developed. It is to be noted that the point 52 of low speed operation is considerably to the right of the 100% torque point, indicating that the low speed operation is at high torque.

It is obvious that by increasing the amount of friction applied by brake 46, Fig. 1, the resistor 43 may be dispensed with or, if the conductance of resistor 44 be increased, there will be no need for brake 46. Likewise if the resistance to rotation of the load is sufficiently great both the brake and resistor may be dispensed with.

A symmetrical circuit requiring no center tap on the transformer secondary winding is depicted in Fig. 4. This circuit also deenergizes both motor windings when the manual switch 53 is in the center position, so that the motor cannot creep, even if brake 46 be omitted. The switch terminals 54 and 56 are interconnected as are terminals 57 and 58. A rectifier 59 is connected between the two interconnected terminal pairs. Terminals 61 and 62 are connected to end terminals 63 and 64 of the motor windings 66 and 67, and a condenser 68 is connected between them. The transformer secondary winding terminals 69 and 71 are connected to switch terminal 57 and to the motor common terminal 72.

In the operation of the circuit of Fig. 4, when the switch is operated toward the left, terminals 54 and 61 are connected. Current flows from transformer terminal 69 through rectifier 59 to motor terminal 63, from which both alternating and direct components flow through winding 66 to terminal 72 and back to transformer terminal 71. The alternating component only flows through condenser 68, is phase advanced, and energized motor winding 67. Additional current flowing through resistor 44 to winding 67 tends to reduce motor speed as described in connection with curve F, Fig. 3. The motor thereupon rotates at slow speed, the brake 46 increasing the motor load as previously described. Upon full operation of the switch to the left, the rectifier 59 is short circuited and the motor rotates at its full speed. When the switch is moved to the right the same operations ensue except that, the terminals 63 and 64 being interchanged, the direction of motor rotation is reversed.

What is claimed is:

1. A polyphase motor step speed control comprising, a polyphase motor, switch means connecting polyphase power to said motor for full speed operation, means including switch means for connecting alternating current to all phase windings of said motor and for introducing a direct current in at least one of said phase windings for operation at a definite selected low speed and a resistor shunting at least one of the phase windings of said motor.

2. A polyphase motor step speed control in accordance with claim 1 in which said motor is provided with a mechanical brake.

3. A polyphase motor step speed control comprising, a polyphase induction motor, an alternating current source, a direct current source, switch means having a central zero speed position, extreme positions for full forward and full reverse motor speeds, and two intermediate positions for forward and reverse motor low speeds at high torque, means connecting said alternating current source and at least one phase winding terminal of said polyphase motor, means connecting said alternating current source to the remaining phase winding terminals of said motor through the extreme position contacts of said switch, means connecting said direct current source and said alternating current source to said remaining phase winding terminals of said motor through the intermediate position contacts of said switch a mechanical brake associated with said motor and a resistor shunting at least one of said motor windings.

4. A two-phase motor step speed control comprising, an induction motor having first and second phase windings, a single-phase source, a phase splitting condenser connected to said first phase winding, a rectifier having an output containing both alternating and direct current, a step control switch having high and low speed positions, means applying alternating current from said single-phase source through said condenser to said first phase windings, means connecting said rectifier to said single-phase source, means connecting said single-phase source through said switch in its high speed position to said second phase winding, means connecting said rectifier output alternating and direct current through the low speed position of said switch to said second phase winding a mechanical brake positioned on the shaft of said motor, and a resistor connected across both of said phase windings.

5. A two-phase motor reversible step speed control comprising, a center-tapped source of alternating current, a two-phase induction motor having a common terminal connected to said center tap, a condenser connecting said source to one said motor phase terminal, a switch having a center zero position extreme forward and reverse speed positions and intermediate forward and reverse low speed positions, connections from said source to said switch, a connection from which said switch to the other said motor phase terminal, a rectifier, means including said switch for short-circuiting said rectifier when the switch is in either extreme position a mechanical brake positioned on the shaft of said motor, and a resistor connected between said motor phase terminals.

6. A step-controlled motor energization circuit comprising, a polyphase induction motor, a source of alternating current energizing all of the coils of said motor, a source of direct current energy connected to superimposed on the alternating current applied to one coil of said motor means for shifting the phase of the alternating current applied to at least said one coil with respect to the phase of the alternating current applied to the other of said coils, switch means for removing the superimposition of said direct current energy, and means for dissipatively loading said motor.

7. A step-controlled motor energization circuit in accordance with claim 6 in which said dissipative loading means comprises an adjustable mechanical brake on the shaft of said motor.

8. A step-controlled motor in accordance with claim 6 in which said dissipative loading means comprises a dynamic braking resistance across at least one of the windings of said motor.

References Cited in the file of this patent

UNITED STATES PATENTS

| | | |
|---|---|---|
| 1,954,657 | Welch | Apr. 10, 1934 |
| 2,119,205 | Doyle et al. | Mar. 31, 1938 |
| 2,141,056 | Watkins | Dec. 20, 1938 |
| 2,196,402 | Snyder | Apr. 9, 1940 |
| 2,227,467 | Sweeny | Jan. 7, 1941 |
| 2,419,431 | Williams | Apr. 22, 1947 |
| 2,586,095 | Roters | Feb. 19, 1952 |
| 2,677,087 | Willmott | Apr. 27, 1954 |